United States Patent [19]

Meinhardt et al.

[11] Patent Number: 6,022,909
[45] Date of Patent: *Feb. 8, 2000

[54] PHOTOCHROMIC INK

[75] Inventors: Michael B. Meinhardt, Salem; Randall R. Bridgeman, Hubbard, both of Oreg.

[73] Assignee: Tektronix, Inc., Wilsonville, Oreg.

[*] Notice: This patent is subject to a terminal disclaimer.

[21] Appl. No.: 08/951,187

[22] Filed: Oct. 15, 1997

Related U.S. Application Data

[63] Continuation of application No. 08/671,998, Jun. 28, 1996, Pat. No. 5,827,918.

[51] Int. Cl.[7] .............................. C09D 11/10; C08K 5/20; C08K 5/205; C08K 5/21
[52] U.S. Cl. ...................... 523/161; 523/160; 106/31.32; 106/31.64; 524/198; 524/210; 524/211; 524/212; 524/230
[58] Field of Search .............................. 106/31.32, 31.64; 524/198, 210, 211, 212, 230, 160, 161

[56] References Cited

U.S. PATENT DOCUMENTS

| | | | |
|---|---|---|---|
| 5,492,559 | 2/1996 | Oliver et al. .............................. 106/22 |
| 5,551,973 | 9/1996 | Oliver et al. .............................. 106/22 |
| 5,593,486 | 1/1997 | Oliver et al. .............................. 106/22 |
| 5,621,022 | 4/1997 | Jaeger et al. ............................ 523/161 |
| 5,827,918 | 10/1998 | Titterington et al. .................... 523/161 |

OTHER PUBLICATIONS

Hot Melt Ink for Thermal Jet Printing, Journal of Imaging Science and Technology, vol. 36, No. 2, Mar./Apr. 1992, pp. 176–180.

Keystone Technical Bulletin, Specialty Colorants—Reversacols, Technical Bulletin No. 180, Revised Oct. 1995.

*Primary Examiner*—Peter A. Szekely
*Attorney, Agent, or Firm*—Ralph D'Alessandro; Francis I. Gray; Charles F. Moore

[57] ABSTRACT

A photochromic phase change ink composition that contains (A) at least one selected polymeric and photochromic yellow phase change colorant and (B) a phase change ink carrier composition comprising (1) a resin selected from the group consisting of a urethane resin, a mixed urethane/urea resin and mixtures thereof; and (2) a mono-amide.

1 Claim, No Drawings

PHOTOCHROMIC INK

This application is a continuation-in-part of U.S. Ser. No. 08/671,998 filed Jun. 28, 1996, now U.S. Pat. No. 5,827,918, the specification of which is incorporated by reference herein in its entirety.

BACKGROUND OF THE INVENTION

1. Field of the Invention

The present invention generally relates to selected phase change ink compositions containing certain polymeric dyes in combination with certain phase change ink carrier compositions.

2. Brief Description of the Related Art

In general, phase change inks are in the solid phase at ambient temperature, but exist in the liquid phase at the elevated operating temperature of an ink jet printing device. At the jet operating temperature, droplets of liquid ink are ejected from the printing device and, when the ink droplets contact the surface of the printing media, they quickly solidify to form a predetermined pattern of solidified ink drops.

Phase change inks are desirable for ink jet printers since they remain in a solid phase at room temperature, during shipping, long-term storage, and the like. Also, the problems associated with nozzle clogging due to ink evaporation are largely eliminated, thereby improving the reliability of ink jet printing. Furthermore, in prior art phase change ink jet printers where the ink droplets solidify immediately upon contact with the substrate, migration of ink along the printing medium is prevented and dot quality is improved. This is also true of the processes and ink compositions described herein.

The phase change inks generally comprise a phase change ink carrier composition that is combined with a phase change ink compatible colorant. Preferably, a colored phase change ink will be formed by combining the above-described ink carrier composition with compatible subtractive primary colorants. The subtractive primary colored phase change inks of this invention comprise four component dyes, namely, cyan, magenta, yellow and black. U.S. Pat. Nos. 4,889,560 and 5,372,852 teach the subtractive primary colorants employed typically may comprise dyes from the classes of Color Index (C.I.) Solvent Dyes, Disperse Dyes, modified Acid and Direct Dyes, and a limited number Basic Dyes.

U.S. Pat. No. 5,621,022 teaches the use of certain polymeric dyes in a phase change ink composition. These polymeric dyes were selected from the group consisting of (1) an organic chromophore having a polyoxalkylene substituent and (2) an organic chromophore having a polyoxyalkylene substituent and a carboxylic acid or nonreactive derivative thereof covalently bonded to the polyoxyalkylene substituent. Examples of these polymeric dyes are available from Milliken & Company and include Milliken Ink Yellow 869, Milliken Ink Blue 92, Milliken Ink Red 357, Milliken Ink Yellow 1800, Milliken Ink Black 8915-67.

The use of these polymeric dyes in phase change inks were found to possess several unexpected results including:

(1) These polymeric dyes are very soluble in the phase change carrier composition and possess high water fastness and high resistance to "bleeding" or weeping of the color from the carrier composition when printed samples are subjected to high temperatures or humidity.

(2) These polymeric dyes are thermally stable in the carrier composition. This is important because the resulting phase change ink compositions may remain molten for weeks at a time in the ink jet printer.

(3) These polymeric dyes also act as a plasticizer for the formulation. This enables the formulator to replace at least a portion of the commercial plasticizer that is normally part of the formulations disclosed in the inks of U.S. Pat. Nos. 4,889,506 and 5,372,852.

(4) These polymeric dyes are compatible with each other and with most conventional powdered dyes currently used in phase change ink compositions. Thus, mixtures of inks of different colors do not form a precipitate when mixed together. This is important because, during the purging and wiping procedures that are used in maintenance of the ink jet device, all four colors of ink are mixed together on the faceplate of the jet array. Any precipitates caused by reactions between inks or dyes have the potential to clog the orifices of the jets. This compatibility also allows for the mixing of these polymeric dyes with powdered dyes of the same primary color into the same ink composition to achieve high color strengths that would not be possible with either dye type by itself.

Separately, U.S. Pat. No. 5,827,918, filed on Jun. 28, 1996 and assigned to the same assignee as the present application, discloses the use of urethane isocyanate-derived resins, urea isocyanate derived resin and monomide in the phase change ink carrier composition for a phase change ink. This patent also teaches that polymeric dyes such as those disclosed in U.S. Pat. No. 5,621,022 may be used as the phase change colorant materials. In particular, Example 16 of this U.S. patent discloses a yellow ink made from a urethane wax (reaction product of octadecyl alcohol and octadecylisocyanate), an urethane resin (reaction product of octylphenol ethoxylate and isophorone diisocyanate), a tackifier resin (glycerol ester of hydrogenated abietic (rosin) acid), an antioxidant and a yellow polymeric acid (Milliken Yellow 869). This patent did not teach that this particular yellow ink or any other ink described in this application possessed photochromic properties.

The photochromic effect (photochromism) in general is a reversible change of a single chemical species between two states having distinguishably different absorption spectra, wherein the change is induced in at least one direction by the action of electromagnetic radiation. This inducing radiation, as well as the changes in the absorption spectra, is usually in the ultra-violent, visible or infrared regions. In some instances, the change in one direction may also be thermally induced. The single chemical species can be a molecule or an ion, and the reversible change in states may be a conversion between two molecules or ions, or the dissociation of a single molecule or ion into two or more species, with the reverse change being a recombination of the two or more species thus formed into the original molecule or ion. Photochromic phenomena are observed in both organic compounds, such as anils, disulfoxides, hydrazones, osazones, semicarbazones, stilbene derivatives, o-nitrobenzyl derivatives, spiro compounds, and the like, and in inorganic compounds, such as metal oxides, alkaline earth metal sulfides, titanates, mercury compounds, copper compounds, minerals, transition metal compounds such as carbonyls, and the like. Inks containing photochromic components could be used as a security ink, watermark or to create some other means for authenticating a document (e.g., a stock certificate).

Accordingly, there is a need for new photochromic inks to act as new ways for authenticating documents or to provide a way to differentiate items from one another. The present invention provides a solution to that need.

BRIEF SUMMARY OF THE INVENTION

Accordingly, one aspect of the present invention is directed to a photochromic phase change ink that comprises (A) at least one polymeric and photochromic yellow phase change colorant, having either (1) an organic chromophore having a polyoxyalkalene substituent or (2) an organic chromophore having a polyoxyalkylene substituent and a carboxylic acid or non-reactive ester or amide derivative thereof covalently bonded to the polyoxyalkylene substituent; and (B) a phase change ink carrier composition comprising (1) a mixed urethane/urea resin; and (2) a mono-amide.

Another aspect of the present invention is directed to a process for detecting a photochromic effect in phase change ink comprising the steps of: 1) applying a phase change ink composition to a substance, said phase change ink composition comprising (A) at least one polymeric and photochromic yellow phase change colorant with either (1) an organic chromophore having a polyoxyalkylene substituent or (2) an organic chromophotic having a polyoxyalkylene substituent and a carboxylic acid or non-reactive ester or amide derivative thereof covalently bonded to the polyoxyalkylene substituent; and (B) a phase change ink carrier composition comprising (1) a resin selected from the group consisting of a urethane resin, a mixed urethane/urea resin and mixtures thereof; and (2) mono-amide; and (2) subjecting said applied phase change ink composition to sufficient radiation or thermal energy to cause a photochromic effect with said yellow colorant in said phase change ink. Thermal energy could be required to revert from a radiation induced photochromic darkening effect that has been preserved by subjecting to low temperature. Radiation energy, however, is always required to achieve the photochromic darkening effect.

DESCRIPTION OF THE PREFERRED EMBODIMENTS

The photochromic phase change ink compositions of the present invention comprises a specific photochromic phase change ink colorant and a specific phase change ink carrier composition.

The photochromic phase change ink colorant is a yellow polymeric dye that is characterized by three primary components: (1) an organic chromophore having (2) at least one polyoxyalkylene substituent and, optionally (3) a carboxylic acid or nonreactive derivative thereof covalently bonded to the polyoxyalkylene substituent. These yellow polymeric dyes are described in U.S. Pat. Nos. 5,176,745 and 5,621,022, both of which are incorporated herein by reference in their entireties. The preferred example of this colorant is Milliken Ink Yellow 896 available from Milliken & Company.

The phase change ink carrier composition used in the present invention has two critical ingredients, namely, a resin, a mixed urethane/urea resin and a mono-amide. The resin can be a diurethane resin or mixtures thereof.

The term "mixed urethane/urea resin" as used in the present specification and claims is defined as any resin that is both an urethane and an urea and is the reaction product of an isocyanate with an alcohol and amine.

Any suitable reaction condition for making mixed urethane/urea resins by condensation of at least one alcohol and at least one amine with at least one isocyanate may be employed in the practice of the present invention. Preferably, the reaction is carried out at elevated temperatures (e.g. about 60° C. to about 160° C.) in the presence of a urethane or urea reaction catalyst such as dibutyltindilaurate, bismuth tris-neodecanoate, cobalt benzoate, lithium acetate, stannous octoate or triethylamine. The reaction conditions preferably are conducted in an inert atmosphere, such as argon or nitrogen gas or other suitable atmosphere, to prevent oxidizing or yellowing the reaction products and to prevent undesirable side reactions. The mole ratio of reactants is adjusted so that the isocyanate functionalities are completely consumed in the reaction with a slight molar excess of alcohol or amine typically remaining. Conceptually the reactants can be added together in any order and/or added to the reaction as physical mixtures. However, in the preferred embodiments in the invention, reaction conditions and the order of the addition of reactants are carefully controlled for several reasons. First, reaction conditions and reactant additions are chosen to provide a controlled exothermic reaction. Secondly, when reacting mixtures of alcohols and amines with diisocyanates such as isophorone diisocyanate (IPDI), the order of addition of the isocyanate and the different nucleophiles to the reaction is chosen to tailor the distribution of mixed urethane/urea molecules in the final resin. When doing this, the different activities to isocyanates of alcohols versus amines are employed, as are the different reactivities of the two separate isocyanate groups of IPDI. See J. H. Saunders and K. C. Frisch's "Polyurethanes Part I, Chemistry" published by Interscience of New York, N.Y. in 1962. This control of the reaction conditions and order of addition of the reactants is done to specifically tailor or customize the different types of molecular species in the finished resin so that the resin:

(1) will have a controlled viscosity that is designed for a specific application, (2) will have a controlled glass transition temperature and/or melting point, and (3) will have consistent properties from batch to batch.

The isocyanate-derived resins from these reactions are generally transparent solids having melting points in the range of about 20° C. to about 150° C., viscosities in the range of about 10 cPs to about 5000 cPs at 150° C. and Tg's of about −30° C. to about 100° C. Isocyanate-derived waxes may also be obtained from these reactions which are generally opaque waxy solids having sharp melting points from about 50° C. to about 130° C., and viscosities of about 1 cPs to about 25 cPs at 140° C. The isocyanate-derived resins and waxes display properties such that the higher the Tg and the melting point, the higher is the viscosity. Varying one or more of the readily available commodity chemicals used as chemical precursors will permit custom-tailoring of the properties of the isocyanate-derived resin and wax materials.

Preferred alcohols to react with difunctional and higher isocyanates to make the isocyanate-derived waxes and resins of this invention include any monohydric alcohol. For instance, the monohydric alcohol, any branched alcohol or any cyclic aliphatic alcohol such as methanol, ethanol, (n- and iso)-propanol, (n-, iso, t-) butanol, (n-, iso, t-, and the like)-pentanol, (n-, iso, t-, and the like)-hexanol, (n-, iso-, t-, and the like)-octanol, (n-, iso-, t-, and the like) nonanol, (n- and branched) decanols, (n- and branched) undecanols, (n- and branched) dodecanols, (n- and branched)-hexadecanols, (n- and branched)-octadecanols, 3-cyclohexyl-1-propanol, 2-cyclohexyl-1-ethanol, cyclohexylmethanol, cyclohexanol, 4-methyl cyclohexanol, 4-ethylcyclohexanol, 4-t- butylcyclohexanol, and the like]; an aliphatic/aromatic alcohol [e.g., benzyl alcohol, octyl, nonyl, and dodecylphenol alkoxylates of octyl, nonyl, and dodecylphenol, and alkoxyphenol]; aromatic alcohols such as phenol, naphthol, and the like, and their derivatives; fused ring alcohols (e.g., rosin alcohols, hydroabietyl alcohol, cholesterol, vitamin E, and the like) and other suitable alcohols (e.g., N,N-dimethyl-N-ethanolamine, stearamide-monoethanolamine, tripropyleneglycol monomethylether, hydroxybutanone, menthol, isoborneol, terpineol, 12-hydroxy stearyl stearamide, and the like). It will be obvious to those skilled in the art that small amounts (on a molar basis) of polyols could also be incorporated into the reaction mixture to produce oligomeric species in the resins if so desired. The preferred alcohols are hydroabietyl alcohol, octylphenol ethoxylate and octadecyl alcohol.

Preferred amines to react with difunctional and higher isocyanates to make the isocyanate-derived waxes and resins of the invention include any monofunctional amine, with the exception of tertiary amines void of other nuycleophilic functional groups (e.g., triethylamine). For instance, the monoamine could be any aliphatic primary or secondary amine (e.g., a $C_1$–$C_{22}$ or higher linear amine, any branched amine or any cyclic aliphatic amine) such as methyl amine, ethyl amine, (n- and iso-) propyl amine, (n-, iso-, and t-) butyl amine, (n-, iso-, t-, and the like) octyl amine, (n-, iso-, t-, and the like) nonyl amine, (n- and branched) decyl amine, (n- and branched) hexadecyl amines, (n- and branched) dodecyl amines, dimethyl amine, diethyl amine, di(n- and iso-)propyl amines, di(n- iso, t-) butyl amine, di(n-, iso-, t-, and the like)pentyl amine, di(n-, iso-, t-)butyl amine, di(n-, iso, t, and the like)cyclohexyl amine, di(n, iso-, t-, and the like)hexyl amine, di(n-, iso, t-, and the like)pentyl amine, di(n-, iso-, t-, and the like)hexyl amine, di(n-, iso-, t-, and the like)octyl amine, di(n-, iso-, t-, and the like)octadecyl amine, cyclohexyl amine, 2,3-dimethyl-1-cyclohexylamine, piperidine, pyrrolidine, and the like; an aliphatic/aromatic amine (e.g., benzyl amine or analogues with longer or additional alkyl chains); aromatic amines such as aniline, anisidine, and the like; fused ring amines such as rosin amine, dihydroabietyl amine, hydroabietyl amine, and the like; and miscellaneous amines (e.g., adamantyl amine, isonipecotamide, polyoxyalkylenemonoamines, such as M-series Jeffamines available commercially from Huntsman Chemical Company of Austin Tex.; 3,3'-diamino-N-methyldipropylamine, and the like. It will be obvious to those skilled in the art that small amounts (on a molar basis) of polyamines could also be incorporated into the reaction mixture to produce oligomeric species in the resins if so desired. The preferred amine is octadecyl amine.

Preferred alcohols to react with monofunctional isocyanates to make the isocyanate-derived waxes and resins of this invention include any monohydric alcohol. For instance, the monohydric alcohol could be any aliphatic alcohol [e.g., a $C_1$–$C_{22}$ or higher linear alcohol, any branched alcohol or any cyclic aliphatic alcohol such as methanol, ethanol, (n- and iso-)propanol, (n-, iso-, and t-) butanol, (n-, iso-, t-, and the like) pentanol, (n-, iso-, t-, and the like hexanol, (n-, iso-, t-, and the like) octanol, (n-, iso-, t-, and the like) nonanol, (n- and branched) decanols, (n- and branched) undecanols, (n- and branched) dodecanols, (n- and branched) hexadecanols, (n- and branched) octadecanols, 3-cyclohexyl-1-propanol, 2-cyclohexyl-1-ethanol, cyclohexylmethanol, cyclohexanol, 4-methyl cyclohexanol, 4-ethylcyclohexanol, 4-5-butylcyclohexanol, and the like]; an aliphatic/aromatic alcohol (e.g., benzyl alcohol, octyl, monyl, and dodecylphenol alkoxylates or octyl, nonyl, and dodecylphenol, alkoxyphenol); aromatic alcohols such as phenol, napthol, and the like, and their derivatives; fused ring alcohols (e.g., rosin alcohols, hydroabietyl alcohol, cholesterol, vitamin E, and the like) and other suitable alcohols (e.g., N,N-dimethyl-N-ethanolamine, stearamide-monoethanolamine, tripropyleneglycol monomethylether, hydroxybutanone, menthol, isoborneol, terpineol, 12-hydroxy stearyl stearamide, and the like), as well as multifunctional alcohols such as ethylene glycol, diethylene glycol, triethylene glycol, dimethylolpropionic acid, sucrose, polytetra ethylene glycol (MW<~3000), polypropylene glycol (MW<~3000), polyester polyols (MW<~3000), poyethylene glycol (MW<~3000), pentaerythritol, triethanol amine, glycerin, 1,6-hexanediol, N-methyl-N,N-diethanol amine, trimethylol propane, N,N,N',N'-tetrakis(2-hydroxypropyl) ethylenediamine, and the like. The preferred alcohol is octadecanol.

Preferred amines to react with monofunctional isocyanates to make the isocyanate-derived waxes and resins of this invention include any monofunctional amine, with the exception of tertiary amines void of other nucleophilic functional groups (e.g., triethylamine). For instance, the monoamine could be any aliphatic primary or secondary amine (e.g., a $C_1$–$C_{22}$ or higher linear amine, any branched amine or any cyclic aliphatic amine such as methyl amine, ethyl amine, (n- and iso-)propyl amine, (n-, iso-, and t-) butyl amine, (n-, iso-, t-, and the like) pentyl amine, (n-, iso-, t-, and the like) hexyl amine, (n-, iso-, t-, and the like) octyl amine, (n-, iso-, t-, and the like) nonyl amine, (n- and branched) decyl amine, (n- and branched) undecyl amine, (n- and branched) octadecyl amine, (n- and branched) hexadecyl amine, (n- and branched) dodecyl amine, dimethyl amine, diethyl amine, di(n-, and iso-)propyl amine, di(n-, iso, t-)butyl amine, di(n-, iso-, t-, and the like)pentyl amine, di(n-, iso, t-, and the like)hexyl amine, di(n-, iso-, t-, and the like)octyl amine, di(n-, iso-, t-, and the like)heptyl amine, di(n-, iso, t-, and the like octyl a mnine, di(n-, iso-, t-, and the like)decyl amine, di(n-, iso, t-, and the like)octadecyl amine, 2,3-dimethyl-1-cyclohexylamine, piperidine, pyrrolidine, and the like; any aliphatic/aromatic amines (e.g., benzyl amine or analogues with longer or additional alkyl chains); aromatic amines such as aniline, anisidine, and the like; fused ring amines such as rosin amine, dihydroabietyl amine, hydroabietyl amine, and the like; and miscellaneous amines (e.g., adamantyl amine, isonipecotamide, polyoxyalkylenemono-, di-, or triamines, such as M-, D-, and T-Series Jeffamines available commercially from Huntsman Chemical Company of Austin, Tex.; 3,3'-diamino-N-methyl-dipropylamine, and the like, as well as multifunctional amines such as polyethylene amine; ethylene diamine; hexamethylene diamine; isomers of cyclohexyldiamines; 1,3-pentadiamine; 1,12-dodecanediamine; 3,3-dimethylaminopropylamine; 4,7,10-trioxa-1,13-tridecanediamine; diethylene triamine; 3,3-diamino-N-methyldipropylamine; tris(2-aminoethyl)amine, and the like. The preferred amine is octadecylamine.

Additionally, hydroxyl/amino containing compounds can be employed (with di- and higher functionality isocyanates taking advantage of the difference in reactivity of the amine over the hydroxyl group, or with monoisocyanates reacting with the amine preferentially or with both the amine and the hydroxyl groups). Examples of this include ethanolamine, diethanolamine, and the like.

Preferred precursors to the isocyanate-derived resins and waxes of the present invention include mono-, di- and other poly-isocyanates. Examples of monoisocyanates include octadecylisocyanate; octylisocyanate; butyl and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzoylisocyanate; meta and para-tolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6-dimethylphenylisocyanate; 1-naphthylisocyanate; (naphthyl)ethylisocyanates; and the like. Examples of diisocyanates include isophorone diisocyanate (IPDI); toluene diisocyanate (TDI); diphenylmethane-4,4'-diisocyanate (MDI); hydrogenated diphenylmethane-4,4'-diisocyanate ($H_{12}$MDI); tetra-methyl xylene diisocyanate (TMXDI); hexamethylene-1,6-diisocyanate (HDI); hexamethylene-1,6-diisocyanate; naphthylene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethylhexamethylene diisocyanate; tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; and cyclohexylene diisocyanate and its isomers; uretidione dimers of HDI; and the like. Examples of triisocyanates or their equivalents include the trimethylolpropane trimer of TDI, and the like, isocyanurate trimers of TDI, HDI, IPDI, and the like, and bruit trimers of TDI, HDI, IPDI, and the like. Examples of higher isocyanate functionalities include copolymers of TDI/HDI, and the like, as well as MDI oligomers.

The second critical ingredient of the phase change carrier is at least one mono-amide compound. The mono-amide compound typically comprises either a primary or secondary mono-amide, but is preferably a secondary mono-amide. Of the primary mono-amides, stearamide, such a Kemamide S, manufactured and sold under the listed tradename by Witco Chemical Company, can be employed herein. As for the secondary mono-amides, behenyl behenamide (Kemamide EX-666), and stearyl stearamide (Kemamide S-180), all manufactured by Witco Chemical Company, are extremely useful mono-amides. However, stearyl stearamide (Kemamide S-180) is the mono-amide of choice in producing the modified phase change ink carrier composition of the present invention.

The relative amounts of the three critical ingredients in the present photochromic ink composition are preferably about 0.5% to about 15% by weight of the photochromic yellow dye; about 15% to about 50% by weight of the urethane resin or mixed urethane/urea resin or mixtures thereof; and about 30% to about 70% by weight of the mono-amide, all percentages being by weight of the total photochromic phase change ink.

The photochromic phase change ink carrier composition of the present invention may also contain one or more optional ingredients.

One optional ingredient is a tetra-amide compound. The preferred tetra-amide compounds for producing the modified phase change ink carrier composition are dimer acid-based tetra-amides which preferably include the reaction product of a fatty acid, a diamine (ethylene diamine) and a dimer acid. For purposes of this invention, the term "dimer acid" preferably means a hydrogenated oleic acid dimer product. A preferred example of such a dimer acid is a product known as Empos 1008 Dimer Acid, manufactured and sold under the listed tradename by the Emery Division of Henkel Corporation of Cincinnati, Ohio. Fatty acids having from 10 to 22 carbon atoms are preferably employed in the formation of the dimer acid-based tetra-amide. These dimer acid-based tetra-amides are produced by Union Camp and comprise the reaction product of ethylene diamine, dimer acid, and the following fatty acids: decanoic acid (Union Camp X3203-23), myristic acid (Union Camp X3202-56), stearic acid (Union Camp X3138-43, X3164-23, X3202-44, X3202-46, X3222-655, X3261-37, X3261-53, and X3290-72), and docosanoic acid (Union Camp X3202-36). For the purposes of this invention, the most preferred dimer acid based tetra-amide is the reaction product of dimer acid, ethylene diamine and stearic acid in the stoichiometric ration 1:2:2. Stearic acid is the preferred fatty acid reactant because its adduct with dimer acide and ethylene diamine as the lowest viscosity of the dimer acid based tetra-amides. Its ingredients also are the most readily available and, therefor, lowest in cost.

If the tetra-amide is used, the weight ratio of the tetra-amide to the mono-amide is preferably from about 2:1 to about 1:10.

Various modifying agents may also be optionally added to the phase change carrier composition.

For example, a preferred modifying agent includes certain tackifiers. The preferred tackifiers encompass those that are compatible with fatty amide-containing materials. These include, for example, KE-100 Resin, a glycerol ester of hydrogenated abietic (rosin) acid made by Arakawa Chemical Industries, Ltd., Foral 85, a glycerol ester of hydrogenated abietic (rosin) acid, Foral 105, a pentaerythritol ester of hydroabietic (rosin) acid, Cellolyn 21, a hydroabietic (rosin) alcohol ester of phthalic acid, all manufactured and sold under the listed tradenames by Hercules Chemical Company, Nevtac 2300 and Nevtac 80, synthetic polyterpene resins manufactured and sold under the listed tradenames by Neville Chemical Company, and Wingtack 86, a modified synthetic polyterpene resin manufactured and sold under the listed tradename by Goodyear Chemical Company. The most preferred tackifier, however, is KE-100.

Another of optional modifying agents that can be added to the formulation is certain plasticizers. For instance, many of the phthalate ester plasticizers sold by Monsanto under the tradename "Santicizer" are suitable for this purpose. However, the preferred plasticizer is Santicizer 278, which is the mixed di-ester of phthalic acid with benzyl alcohol and 2,2,4-trimethyl1-1.3-pentanediol mono(2-methylpropanoate) sold under the tradename "Texanol".

Appropriate viscosity modifiers, in addition to the aforementioned mono-amide compounds, can be employed. One example is a well-defined straight chained polyethylene, such as Polywax 850 available commercially from Baker Petrolite Chemical Company.

Other optional additives may be combined with the phase change ink carrier composition. In a typical phase chance ink chemical composition antioxidants are added for preventing discoloration of the carrier composition. The preferred anti-oxidant materials can include those sold under the tradenames Irganox tetrakis[methylene(3,4-di-t-butyl-4-hydroxyhydrocinnamate)]methane, a hindered phenol 1010 manufactured by Ciba Geigy; and Naugard 76, (octadecyl 3,5-di-tert-4-hydroxycinnamate) Naugard 445, [4,4'-di-(alpha, alpha-dimethyl-benzyl)diphenylamine], a hindered amine, Naugard 512, tris(monononylphenyl)phosphite, an organophosphite, and Naugard 524 [tris (2,4-di-tert-butylphenyl)phosphite], an aryl phosphite, manufactured by Uniroyal Chemical Company. However, the most preferred antioxidant is Naugard 445.

While the modifying agents mentioned above are used for the preferred embodiments of this invention, other materials with similar properties can be combined with or used to produce different phase change ink compositions with mechanical and fluidics properties similar to those outlined above. These other materials can include paraffins, microcrystalline waxes, polyethylene waxes, ester waxes, oligomers or low molecular weight polymers and copolymers such as ethylene/vinyl acetate (EVA), ethylene/acrylic acid copolymers, EVA/acrylic acid copolymers, ionomers, copolymers of acrylic acid with polyamides, and the like.

The preferred relative amounts of these optional ingredients of the phase change ink carrier composition are from 0% to about 30% for the tetra-amide; from 0% to about 30% for the tackifier; from 0% to about 30% for the plasticizer; from 0% to about 2% for the antioxidant; and from 0% to about 6% for the waxes and the like, all percentages based on total weight of the photochromic phase change ink.

The photochromic phase change ink colorant and the ingredients of the phase change ink carrier composition may be combined in any conventional way to form a phase change ink. Preferably, it is desirable to simply thoroughly mix all of the ingredients together in a suitable mixing apparatus.

Once formed, the photochromic phase change ink of the present invention may be subject to sufficient photochromic-inducing radiation or heat energy to effect a photochromic effect. This is discussed in U.S. Pat. Nos. 5,492,559; 5,551,973 and 5,593,486, all of which are incorporated herein by reference in their entireties.

The photochromic phase change ink of the present ink may be used in conjunction with a non-photochromic phase change ink into to create a reversible photochromic portion on a printed document or other substrate. This reversible photochromic portion would be only visible when the substrate was subjected to sufficient light energy or heat energy. When that happened, the photochromic portion would change to its other state (e.g. go to a different color) and form a security mark or watermark that is normally hidden from view.

The following examples are illustrative of the photochromic phase change ink formulations of the present invention. All parts and percentages are by weight unless explicitly stated otherwise.

EXAMPLE 1

A Photochromic Yellow Ink Made from Polymeric Dye, Urethane Resins, Viscosity Modifiers and a Plasticizer In a stainless steel beaker were combined about 1310 grams of stearyl stearamide (KEMAMIDE S-180, Witco), about 693 grams of a resin prepared from the reaction of one part hydroabietyl alcohol, one part octadecyl amine and isophorone diisocyanate as described in EXAMPLE 4 of U.S. Pat. No. 5,827,918 filed on Jun. 28, 1996), about 693 grams of a second resin prepared from the reaction of octylphenol ethoxylate and isophorone diisocyanate as described in EXAMPLE 5 of U.S. patent application Ser. No. 08/671,998, and about 159 grams of plasticizer (Santicizer S 278 available from Monsanto Chemical Company). In addition, about 6.25 grams of Uniroyal Naugard 445 anti-oxidant was added. These materials were melted together at a temperature of about 140° C. in an oven, then blended by stirring in a temperature controlled mantle at about 115° C. for about ½ hour. To this stirred mixture were added about 141 grams of a viscosity modifier (Polywax 850 available from Baker Petrolite Chemical Company) and about 129 grams of a polymeric dye (Ink Yellow 869 available from Milliken Chemical Company). After stirring for about ½ hour, the yellow ink was filtered through a heated Mott apparatus (available from Mott Metallurgical) using #3 Whatman filter paper and a pressure of about 15 psi. The filtered phase change ink was poured into molds and allowed to solidify to form ink sticks.

This final ink product was characterized by the following physical properties: viscosity of about 12.9 cPs as measured by a Ferranti-Shirley cone-plate viscometer at about 140° C. The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 788 mL Absorbance Units per gram at absorption $\lambda$ max. The Tg of the final ink product was about 14° C. After printing the ink on a phase change printer, the CIE L*a*b* values were determined on an Applied Color Systems spectrophotometer to give the following approximate color coordinates: L*=84, a*=2, b*=84. Exposure to the intense light of the test instrument left an obvious darkened circle where the exposure had take place. This darken circle would revert to the original lighter color upon standing in the dark for about 30 minutes.

EXAMPLE 2

A Photochromic Yellow Ink Made from a Polymeric Dye, Urethane Resins, and Viscosity Modifiers In a stainless steel beaker were combined about 223 grams of stearyl stearamide (KEMAMIDE S-180, Witco), about 125 grams of a resin prepared from the reaction of one part hydroabietyl alcohol, one part octadecyl amine and isophorone diisocyante as described in EXAMPLE 4 of U.S. Pat. No. 5,827,918, about 125 grams of a second resin prepared from the reaction of octylphenol ethoxylate and isophorone diisocyante as described in EXAMPLE 5 of U.S. Pat. No. 5,827,918, and about 24 grams of a viscosity modifier (Polywax 850 available from Petrolite Chemical Company). In addition, about 1.05 grams of Uniroyal Naugard 445 anti-oxidant was added. The materials were melted together at a temperature controlled heating mantle at about 115° C. To this stirred mixture was added about 24.5 grams of Ink Yellow 869 (Milliken Chemical Company). After stirring for about ½ hour, the yellow ink was filtered through a heated Mott apparatus (available from Mott Metallurgical) using #3 Whatman filter paper and a pressure of about 15 psi. The filtered phase change ink was poured into molds and allowed to solidify to form ink sticks.

This final ink product was characterized by the following physical properties: viscosity of about 12.9 cPs as measured by a Ferranti-Shirley cone-plate viscometer at about 140° C. The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 875 mL Absorbance Units per gram at $\lambda$ max. The Tg of the final ink product was about not determined. After printing the ink on a phase change printer the test prints were exposed to a bright light for about 5 seconds. The samples clearly exhibited a photochromism by darkening relative to an unexposed sample.

EXAMPLE 3

A Photochromic Yellow Ink Made from Polymeric Dyes, Urethane Resins, a Plasticizer and Viscosity Modifiers In a stainless steel beaker were combined about 175 grams of stearyl stearamide (KEMAMIDE S-180, Witco), about 92 grams of a resin prepared from the reaction of one part hydroabietyl alcohol, one part octadecyl amine and isophorone diisocyante as described in EXAMPLE 4 of U.S. Pat. No. 5,827,918, about 92 grams of a second resin prepared from the reaction of octylphenol ethoxylate and isophorone diisocyante as described in EXAMPLE 5 of U.S. Pat. No. 5,827,918, about 22 grams of Santicizer 278 (available from Monsanto Chemical Company) and about 18.8 grams of Polywax 850 (Petrolite Chemical Company). In addition, about 0.80 grams of Uniroyal Naugard 445 anti-oxidant was added. The materials were melted together at a temperature controlled heating mantle at about 115° C. To this stirred mixture was added about 5.1 grams of Ink Yellow 869 (Milliken Chemical Company) and about 13.9 grams of Ink Yellow 1800. After stirring for about ½ hour, the yellow ink was filtered through a heated Mott apparatus (available from Mott Metallurgical) using #3 Whatman filter paper and a pressure of about 15 psi. The filtered phase change ink was poured into molds and allowed to solidify to form ink sticks.

This final ink product was characterized by the following physical properties: viscosity of about 11.3 cPs as measured by a Ferranti-Shirley cone-plate viscometer at about 140° C. The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 704 mL Absorbance Units per gram at $\lambda$ max. The Tg of the final ink product was about 11° C. After printing the ink on a phase change printer the test prints were exposed to a bright light for about 5 seconds. The samples clearly exhibited a photochromism by darkening relative to an unexposed sample.

EXAMPLE 4

A Photochromic Yellow Ink Made from a Polymeric Dye, a Urethane Resin, a Plasticizer, a Tackifier and a Viscosity Modifier In a stainless steel beaker were combined about 135 grams of stearyl stearamide (KEMAMIDE S-180, Witco), about 63 grams of a resin prepared from the reaction of one part hydroabietyl alcohol, one part octadecyl amine and isophorone diisocyante as described in EXAMPLE 4 of U.S. Pat. No. 5,827,918, about 24 grams of Santicizer 278 (available from Monsanto Chemical Company) and about 78 grams a rosin ester tackifier resin available commercially as Arakawa KE-100 (glycerol ester of hydrogenated abietic (rosin) acid available from Arakawa Chemical Industries, Ltd. of Osaka Japan). In addition, about 0.60 grams of Uniroyal Naugard 445 anti-oxidant was added. The materials were melted together at a temperature controlled heating mantle at about 115° C. To this stirred mixture was added about 14.1 grams of Ink Yellow 869 (Milliken Chemical Company). After stirring for about ½ hour, the yellow ink was filtered through a heated Mott apparatus (available from Mott Metallurgical) using #3 Whatman filter paper and a pressure of about 15 psi. The filtered phase change ink was poured into molds and allowed to solidify to form ink sticks.

This final ink product was characterized by the following physical properties: viscosity of about 13.1 cPs as measured by a Ferranti-Shirley cone-plate viscometer at about 140° C. The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 895 mL Absorbance Units per gram at $\lambda$ max. The Tg of the final ink product was not determined. After printing the ink on a phase change printer the test prints were exposed to a bright light for about 5 seconds. The samples clearly exhibited a photochromism by darkening relative to an unexposed sample.

EXAMPLE 5

A Photochromic Yellow Ink Made from a Polymeric Dye, a Urethane Resin, a Plasticizer, and a Viscosity Modifier In a stainless steel beaker were combined about 155 grams of stearyl stearamide (KEMAMIDE S-180, Witco), about 135 grams of a resin prepared from the reaction of one part hydroabietyl alcohol, one part octadecyl amine and isophorone diisocyante as described in EXAMPLE 4 of U.S. Pat. No. 5,827,918, about 9.3 grams of Santicizer 278 (available from Monsanto Chemical Company). In addition, about 0.6 grams of Uniroyal Naugard 445 anti-oxidant was added. The materials were melted together at a temperature controlled heating mantle at about 115° C. To this stirred mixture was added about 14 grams of Ink Yellow 869 (Milliken Chemical Company). After stirring for about ½ hour, the yellow ink was filtered through a heated Mott apparatus (available from Mott Metallurgical) using #3 Whatman filter paper and a pressure of about 15 psi. The filtered phase change ink was poured into molds and allowed to solidify to form ink sticks.

This final ink product was characterized by the following physical properties: viscosity of about 13.4 cPs as measured by a Ferranti-Shirley cone-plate viscometer at about 140° C. The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 905 mL Absorbance Units per gram at $\lambda$ max. The Tg of the final ink product was not determined. After printing the ink on a phase change printer the test prints were exposed to a bright light for about 5 seconds. The samples clearly exhibited a photochromism by darkening relative to an unexposed sample.

EXAMPLE 6

A Photochromic Yellow Ink Made from a Polymeric Dye, a Urethane Resin, a Tackifier and a Viscosity Modifier In a stainless steel beaker were combined about 20 grams of stearyl stearamide (KEMAMIDE S-180, Witco), about 10 grams of a resin prepared of U.S. Pat. No. 5,827,918, about 8 grams of Santicizer 278 (available from Monsanto Chemical Company) and about 78 grams a rosin ester tackifier resin available commercially as Arakawa KE-100 (glycerol ester of hydrogenated abietic (rosin) acid available from Arakawa Chemical Industries, Ltd. of Osaka Japan). In addition, about 0.1 grams of Uniroyal Naugard 445 anti-oxidant was added. The materials were melted together at a temperature controlled heating mantle at about 115° C. To this stirred mixture was added about 2.1 grams of Ink Yellow 869 (Milliken Chemical Company). After stirring for about ½ hour, the yellow ink was filtered through a heated Mott apparatus (available from Mott Metallurgical) using #3 Whatman filter paper and a pressure of about 15 psi. The filtered phase change ink was poured into molds and allowed to solidify to form ink sticks.

This final ink product was characterized by the following physical properties: viscosity of about 12.2 cPs as measured by a Ferranti-Shirley cone-plate viscometer at about 140° C. The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 900 mL Absorbance Units per gram at $\lambda$ max. The Tg of the final ink product was not determined. After printing the ink on a phase change printer the test prints were exposed to a bright light for about 5 seconds. The samples clearly exhibited a photochromism by darkening relative to an unexposed sample.

COMPARISON 1

A Non-Photochromic Yellow Ink Made from a Polymeric Dye, a Tetraamide Resin, a Tackifier, a Plasticizer, and a Viscosity Modifier In a stainless steel beaker were combined about 569 grams of stearyl stearamide (KEMAMIDE S-180, Witco), about 79 grams of a plasticizer Santicizer 278 (available from Monsanto Chemical Company), and about 60 grams of Ink Yellow 869 (Milliken Chemical Company). The components were melted together in an oven at 135° C. After melting the beaker was removed from the oven and placed in a temperature regulated heating mantle and stirred for 1 hour at about 110° C. In addition, about 2.6 grams of Uniroyal Naugard 445 anti-oxidant was added. To this stirred mixture was added 275 grams a rosin ester tackifier resin available commercially as Arakawa KE-100 (glycerol ester of hydrogenated abietic (rosin) acid available from Arakawa Chemical Industries, Ltd. of Osaka Japan), and about 308 g of UNIREZ 2970 (a dimer acid-based tetraamide material manufactured by Union Camp and formed by the reaction of one mole of dimer acid, two moles of ethylene diamine, and two moles of stearic acid) in several portions at a rate so as to avoid freezing the mixture. After addition of the tetraamide was complete, the mixture was stirred at 110° C. for two (2) hours until the tetraamide was completely dissolved. The resulting yellow ink was filtered through a heated Mott apparatus (available from Mott Metallurgical) using #3 Whatman filter paper and a pressure of about 15 psi. The filtered phase change ink was poured into molds and allowed to solidify to form ink sticks.

This final ink product was characterized by the following physical properties: viscosity of about 12.8 cPs as measured by a Ferranti-Shirley cone-plate viscometer at about 140° C. The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 900 mL Absorbance Units per gram at $\lambda$ max. The Tg of the final ink product was about 1° C. After printing the ink on a phase change printer, the following CIE L*a*b* color values were determined: L*=85; a*=0; b*=91. Upon exposure to a bright light the sample yellow print did not show evidence of photochromism.

COMPARISON 2

A Non-Photochromic Yellow Ink Made from a Polymeric Dye, a Tetraamide Resin, a Tackifier and a Viscosity Modifier In a stainless steel beaker were combined about 3170 grams of stearyl stearamide (KEMAMIDE S-180, Witco), about 1553 grams of a rosin ester tackifier resin available commercially as Arakawa KE-100 (glycerol ester of hydrogenated abietic (rosin) acid available from Arakawa Chemical Industries, Ltd. of Osaka Japan) and about 299 grams of Ink Yellow 869 (Milliken Chemical Company). In addition, about 10.0 grams of Uniroyal Naugard 445 anti-oxidant were added. The materials were melted together in a temperature controlled oven at about 140° C. The molten mixture was stirred and further heated in a controlled temperature heating mantle at about 110° C. To this stirred mixture was added about 1266 grams of UNIREZ 2970 (a dimer acid-based tetraamide material manufactured by Union Camp and formed by the reaction of one mole of dimer acid, two moles of ethylene diamine, and two moles of stearic acid) in several portions at a rate so as to avoid freezing the mixture. After stirring for about ½ hour, the yellow ink was filtered through a heated Mott apparatus (available from Mott Metallurgical) using #3 Whatman filter paper and a pressure of about 15 psi. The filtered phase change ink was poured into molds and allowed to solidify to form ink sticks.

This final ink product was characterized by the following physical properties: viscosity of about 12.7 cPs as measured by a Ferranti-Shirley cone-plate viscometer at about 140° C. The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 918 mL Absorbance Units per gram at $\lambda$ max. The Tg of the final ink product about 16° C. After printing the ink on a phase change printer the test prints were exposed to a bright light for about 5 seconds. The printed sample did not exhibit evidence of photochromism.

What is claimed is:

1. A photochromic phase change ink composition that comprises:
   A) at least one polymeric and photochromic yellow phase change ink colorant having either (1) an organic chromophore with a polyoxyalkylene substituent or (2) an organic chromophore having a polyoxyalkylene substituent and a carboxylic acid or non-reactive ester or amide derivative thereof covalently bonded to the polyoxyalkylene substituent; and
   B) a phase change ink carrier composition comprising (1) a resin selected from the group consisting of a urethane resin, a mixed urethane/urea resin and mixtures thereof, and (2) a mono-amide.

* * * * *